US 11,703,466 B2

(12) United States Patent
Dicken (10) Patent No.: US 11,703,466 B2
(45) Date of Patent: Jul. 18, 2023

(54) SAMPLE INSPECTION SYSTEM (71) Applicant: Halo X Ray Technologies Limited, Nottingham (GB)

(72) Inventor: Anthony Dicken, Nottingham (GB)

(73) Assignee: Halo X Ray Technologies Limited, Nottingham (GB)

( * ) Notice: Subject to any disclaimer, the term of this patent is extended or adjusted under 35 U.S.C. 154(b) by 0 days.

(21) Appl. No.: 17/909,683

(22) PCT Filed: Feb. 22, 2021

(86) PCT No.: PCT/GB2021/050434
§ 371 (c)(1),
(2) Date: Sep. 6, 2022

(87) PCT Pub. No.: WO2021/176197
PCT Pub. Date: Sep. 10, 2021

(65) Prior Publication Data
US 2023/0118850 A1 Apr. 20, 2023

(30) Foreign Application Priority Data
Mar. 6, 2020 (GB) .................................... 2003329

(51) Int. Cl.
*G01N 23/207* (2018.01)
(52) U.S. Cl.
CPC ... *G01N 23/207* (2013.01); *G01N 2223/1016* (2013.01)
(58) Field of Classification Search
CPC .................. G01N 23/207; G01N 2223/1016
See application file for complete search history.

(56) References Cited

U.S. PATENT DOCUMENTS 6,442,233 B1 8/2002 Grodzins et al.
8,311,183 B2 * 11/2012 O'Dwyer ......... G01N 23/20091
378/70

(Continued)

FOREIGN PATENT DOCUMENTS

GB         2 297 835 A      8/1996
WO    2010/051366 A2      5/2010
WO    2020/021229 A1      1/2020

OTHER PUBLICATIONS

GB Combined Search and Examination Report dated Jun. 10, 2020 from corresponding GB Application No. 2003329.6, 2 pages.

(Continued)

*Primary Examiner* — David P Porta
*Assistant Examiner* — Mamadou Faye
(74) *Attorney, Agent, or Firm* — Ruggiero McAllister & McMahon LLC (57) ABSTRACT

A sample inspection system and a corresponding method for inspecting a sample is provided. The sample inspection system includes a beam former, a beam modulator an energy resolving detector and a collimator. The beam former is adapted to receive an electromagnetic radiation from an electromagnetic source to generate a primary beam of electromagnetic radiation. The beam modulator is provided at a distance from the beam former to define a sample chamber. The collimator is provided between the beam modulator and the energy resolving detector. The collimator has a plurality of channels adapted to receive diffracted or scattered radiation. Upon incidence of the primary beam onto the beam modulator, the beam modulator provides a reference beam of diffracted or scattered radiation. The energy resolving detector is arranged to detect the reference beam.

21 Claims, 7 Drawing Sheets

(56) References Cited

U.S. PATENT DOCUMENTS 10,295,485 B2    5/2019   Yun et al.
2003/0161526 A1   8/2003   Jupiter et al.

OTHER PUBLICATIONS

International Search Report and Written Opinion dated Jun. 8, 2021 from corresponding International Patent Application No. PCT/GB2021/050434, 11 pages.

Written Opinion of the International Preliminary Examining Authority dated Feb. 4, 2022 from corresponding International Patent Application No. PCT/GB2021/050434, 4 pages.

International Preliminary Report on Patentability dated Apr. 26, 2022 from corresponding International Patent Application No. PCT/GB2021/050434, 19 pages.

\* cited by examiner

SAMPLE INSPECTION SYSTEM

CROSS REFERENCE TO RELATED APPLICATIONS

This application is a U.S. National Stage Application under 35 U.S.C. § 371 of International Application No. PCT/GB2021/050434, filed Feb. 22, 2021, and claims the benefit of United Kingdom Patent Application No. GB 2003329.6, filed Mar. 6, 2020, the entire contents all of which is hereby incorporated by reference in their entirety.

BACKGROUND OF THE DISCLOSURE

1. Field of the Disclosure

The disclosure relates to a sample inspection system. In particular the disclosure relates to a sample inspection system for identifying restricted or illegal substances.

2. Description of the Related Art

Security scanning systems can be implemented using various X-ray based technologies. X-rays interact with matter through different processes that include pair production, photoelectric effect absorption, elastic (Rayleigh or Thomson) and inelastic (Compton) scattering processes.

Absorption based techniques, such as dual-energy X-ray absorptiometry (DXA) techniques can be used to establish a material atomic number Z and electron density by measuring the attenuation of an X-ray beam transmitted through a sample at broadly two different X-ray energies. X-ray photons that have undergone the photoelectric effect or Compton scattering are measured by their absence in the detected signal. However dual-energy X-ray techniques do not provide structural information (d-spacing) of the sample.

X-ray diffraction can be used to identify the nature of a material having a degree of structural order, for instance a repeating pattern of atoms, with a high degree of accuracy. X-ray diffraction techniques such as X-ray crystallography, use an elastic scattering process such as Rayleigh scattering in which an outgoing X-ray has the same wavelength as an incoming X-ray. A diffraction pattern produced by the Rayleigh scattered radiation is used to determine the lattice structure of the matter of the sample under inspection via Bragg's Law.

Security protocols for restricted areas, such as airports, sensitive facilities of national infrastructure and some public spaces, rely on a linked series of screening processes, typically consisting of multiple stages of analysis, with each stage being targeted by the previous. Such processes are traditionally supervised and operated by human interaction and may be slow or ineffectual, dependent on the protocols applied.

Automated processes can be successfully applied to this scenario if the target point in a container (bin or tray) between each stage, remains at the same relative position between each screening process. However, mechanical apparatus used to move the container, such as conveyor belts or automated tray return systems, may produce vibration or have interconnections, or have acute changes in direction, which may change the position of an item of interest within the container from one location to another. In this scenario, the second module may probe an area of the container that does not correspond to the area of interest initially identified by the previous screening stage.

U.S. Pat. No. 8,311,183B2 describes an on-line energy dispersive X-ray (EDXRD) analyser for mineralogical analysis of material. The EDXRD analyser includes a primary beam collimator, a scatter collimator, and a detector collimator. The primary beam collimator is disposed between a collimated source of polychromatic X-rays and an energy resolving X-ray detector. The scatter collimator is disposed between the primary beam collimator and the energy resolving X-ray detector.

WO 2020/021229A1 describes an apparatus for identifying unwanted items as part of a security screening system. The apparatus has a platform for receiving the sample, at least one electromagnetic radiation emitter, a plurality of detectors and a calculator. The electromagnetic radiation emitter is adapted to provide a plurality of conical shells of radiation. Each conical shell has a characteristic propagation axis associated with it. The detectors are arranged to detect radiation diffracted by the sample upon incidence of one or more conical shells of radiation. Each detector is located on the characteristic propagation axis associated with a corresponding conical shell.

U.S. Ser. No. 10/295,485B2 describes an x-ray transmission spectrometer system that includes a compact high brightness x-ray source, an optical system with a low pass spectral filter property to focus the x-rays through an object to be examined, and a spectrometer comprising a crystal analyzer to disperse the transmitted beam.

It is an object of the disclosure to address one or more of the above-mentioned limitations.

SUMMARY

According to a first aspect of the description, there is provided a sample inspection system comprising a beam former adapted to receive an electromagnetic radiation from a source to generate a primary beam of electromagnetic radiation; a beam modulator distal from the beam former to define a sample chamber for receiving a sample; an energy resolving detector and a collimator arranged between the beam modulator and the energy resolving detector, the collimator comprising a plurality of channels, each channel being adapted to receive diffracted or scattered radiation; wherein upon incidence of the primary beam onto the beam modulator, the beam modulator provides a reference beam of diffracted or scattered radiation, the energy resolving detector being arranged to detect the reference beam.

Optionally, the energy resolving detector is spatially resolved to provide energy spectra corresponding to different locations of the energy resolving detector.

Optionally, the sample inspection system comprises a processor coupled to the energy resolving detector.

Optionally, upon provision of a sample within the sample chamber, a portion of the primary beam transmitted through the sample is attenuated, while the remaining part of the primary beam remains unattenuated; the processor being configured to compare energy spectra derived from the attenuated primary beam with energy spectra derived from the unattenuated beam to generate a contrast image of the sample.

Optionally, the contrast image is generated by comparing one or more predefined energy bands of the energy spectra.

Optionally, the processor is configured to calculate at least one of an effective atomic number and an electron density of the sample based on the comparison.

Optionally, the processor is adapted to compare the contrast image with another image to confirm a location of the sample. For instance, the contrast image may be compared with an X-ray absorption image from a pre-screening apparatus.

Optionally, the processor is configured to calculate a parameter of the sample based on detected diffracted radiation from the sample; wherein the parameter comprises a lattice spacing of the sample.

Optionally, the beam modulator comprises a flat body forming an aperture. For instance, the aperture may be shaped matching a profile of the primary beam. For example the aperture may be a circular aperture.

Optionally, the beam modulator comprises a tapered tubular body. For instance the tapered tubular body may be a truncated cone or a truncated pyramid.

Optionally, the beam modulator is made at least in part of a crystalline material. For example the crystalline material may be a metallic material or an alloy. The crystalline material may have a high crystallographic symmetry to diffract at a limited number of discrete energies.

Optionally, the crystalline material has a lattice d-spacing less than about 2.5 angstroms. For example between 2 and 2.2 angstroms. For instance the beam modulator may be made of nickel, copper or magnesium oxide.

Optionally, the crystalline material has a lattice d-spacing greater than about 7 angstroms. For example between 7 and 22 angstroms. For instance the beam modulator may be made of ammonium iron sulphate, dl-leucine or dioctyl sodium sulfosuccinate docusate sodium.

Optionally, the beam modulator is made at least in part of an amorphous material. For example the beam modulator may be made of sodium lead phosphate, chlordiazepoxide or silica.

Optionally, the primary beam is a conical shell beam of electromagnetic radiation. For example the beam former may comprise a body provided with a slit having a truncated conical shape profile to provide a conical shell of electromagnetic radiation.

Optionally, the primary beam has a characteristic propagation axis associated with it, and the collimator is provided along the characteristic propagation axis of the primary beam.

Optionally, the sample inspection system comprises a source of electronic radiation. The source of electromagnetic radiation may be a source of ionizing radiation. For example the source of electromagnetic radiation may be an X-ray source or a gamma-ray source.

Optionally, the source of electromagnetic radiation is a polychromatic source.

Optionally the source of electromagnetic radiation, the beam former, the beam modulator, the collimator and the energy resolving detector form a detection apparatus, the inspection system comprising a mechanical apparatus for moving the detection apparatus to a specific position to inspect the sample, and a controller for controlling the mechanical apparatus.

Optionally, the controller is adapted to receive coordinates of a sample of interest.

According to a second aspect of the disclosure, there is provided a method for inspecting a sample, the method comprising generating with a beam former a primary beam of electromagnetic radiation; providing a beam modulator distal from the beam former to define a sample chamber; providing an energy resolving detector and a collimator arranged between the beam modulator and the energy resolving detector, the collimator comprising a plurality of channels, each channel being adapted to receive diffracted or scattered radiation; illuminating the beam modulator with the primary beam to generate a reference beam of diffracted or scattered radiation, and detecting the reference beam using the energy resolving detector.

Optionally, the method comprises providing a sample within the sample chamber such that a portion of the primary beam transmitted through the sample is attenuated, while the remaining part of the primary beam remains unattenuated, and comparing energy spectra derived from the attenuated primary beam with energy spectra derived from the unattenuated beam to generate a contrast image of the sample.

The options described with respect to the first aspect of the disclosure are also common to the second aspects of the disclosure.

BRIEF DESCRIPTION OF DRAWINGS

The description is described in further detail below by way of example and with reference to the accompanying drawings, in which.

DETAILED DESCRIPTION

Figure 1:
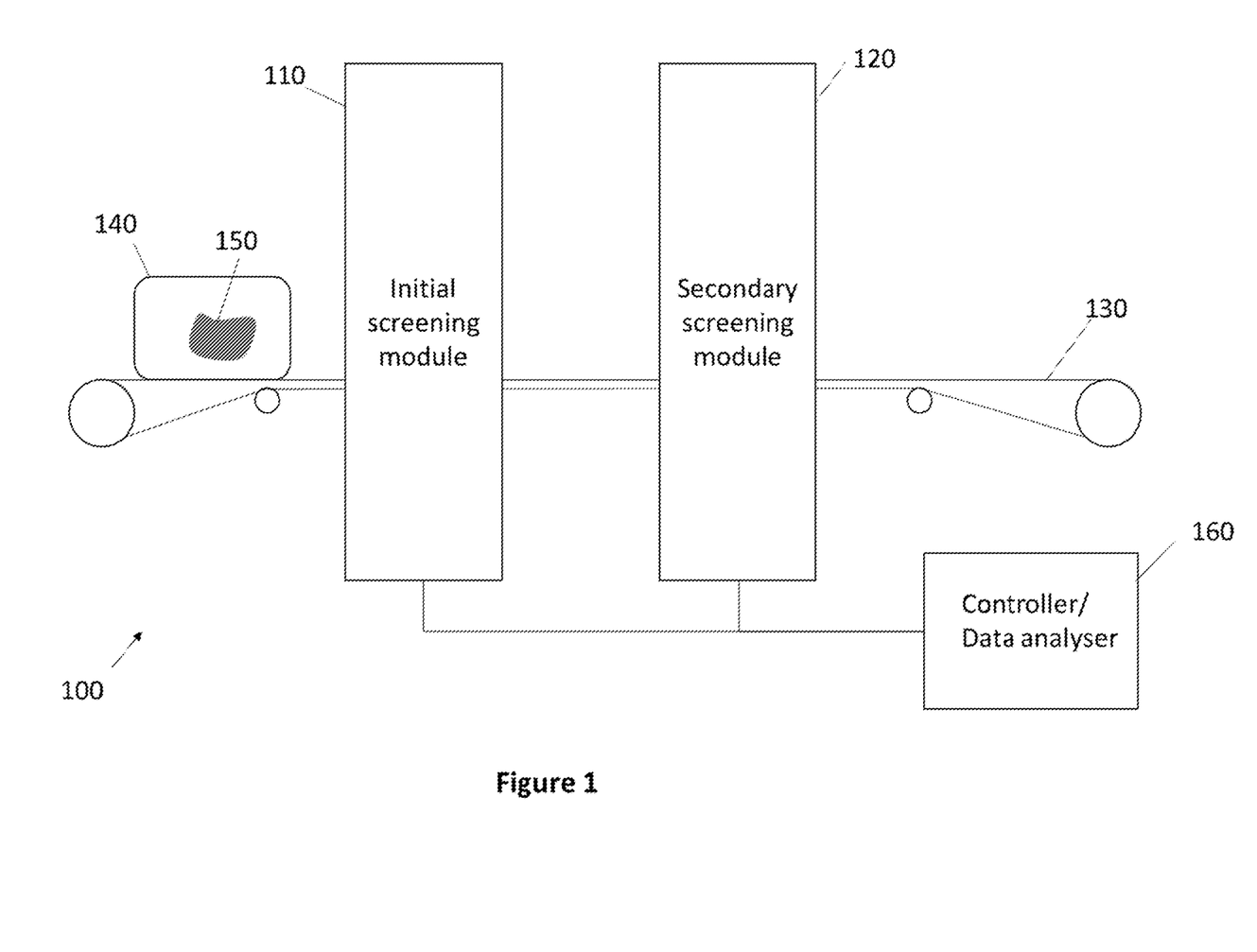
FIG. 1 is a diagram of a sample inspection system.

FIG. 1 illustrates a scanning system. The system 100 is provided with a first module 110, also referred to as the initial screening module and a second module 120, also referred to as secondary screening module. A platform 130 is provided to receive a container 140, such as a bag or a suitcase or an item within a bin or tray, containing an item or sample 150. The platform 130 may be implemented as a conveyor belt for moving the container 140 towards a first detection area associated with the first module 110 and a second detection area associated with the second module 120. A data analyser 160 coupled to the first and second modules may be provided to perform analysis of the data collected by the modules 110 and 120, respectively.

The first module 110 may be implemented in different fashions. For instance, the first module may take the form of a static dual-view system, a static limited view system or CT solution that employs a rotating gantry or a static arrangement. The first module 110 may be a single, dual or multi-energy detector which may provide information regarding Z effective atomic number Zeff and/or electron density of the sample under inspection. The data analyser 160 may combine information from the first module 110 with additional information collected by the second module 120 to obtain a better analysis of the sample 150.

In operation the initial screening module 110 scans the container 140 to identify the potential presence of one or more prohibited items within the container. For instance, a prohibited item may be a restricted substance, or an item classified as illegal. If the initial screening module 110 identifies item 150 as restricted, then the first module 110 communicates the coordinates of the item 150 to the second module 120. The second module 120 then performs a second measurement. The second measurement provided by the second module 120 can be used to either confirm or disregard the result previously obtained by the first module 110.

During the transit from the initial screening module 110 to the secondary screening module 120, the item of interest 150 may move, for instance due to mechanical vibrations, belt changes or acute direction changes of the platform 130. As a result, there is a potential risk for the secondary screening module 120 to probe an area that does not correspond to the location of the item 150 at the point it passes through the secondary module. The screening module 120 of the present disclosure is adapted to verify that the data collected by the secondary module arises from the correct location of item 150, as identified by the initial screening module 110.

The second module 120 may be implemented in different ways. For instance the second module 120 may include a single detector that laterally translates across the belt. In this case a mechanical arrangement may be provided to translate the second module 120 along an axis orthogonal to the direction of translation defined by the conveyor belt 130. In another implementation the second module 120 may include multiple detectors or a rotating gantry of detectors.

Figure 2A:
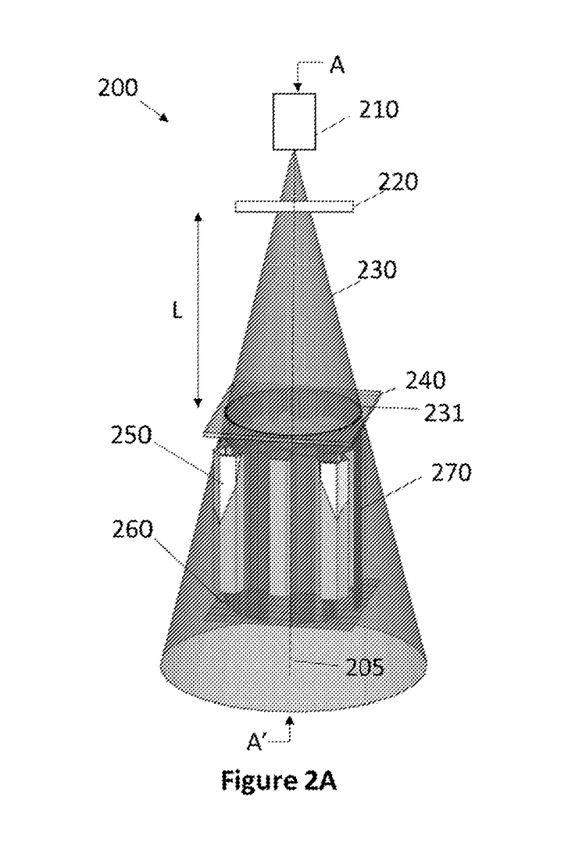
FIG. 2A is a diagram of an X-ray apparatus for use with the sample inspection system of FIG. 1.

FIG. 2A is a diagram of a sample detection system 200. The sample detection system 200 is suitable for use in the screening module 120 of FIG. 1. The detection system 200 may also be used on its own, that is without an initial screening module. The system 200 includes an electromagnetic EM source 210 such as an X-ray point source, a mask or beam former 220 for forming a primary beam 230, a primary beam modulator 240, a collimator 250 and an energy resolving detector 260 for detecting the energy of scattered or diffracted photons.

The EM source 210 is aligned with the mask 220 for forming the primary beam 230 of electromagnetic radiation. The EM radiation source 110 may be adapted to provide high-energy electromagnetic radiations. The high EM radiations may include ionizing radiations such as X-ray or gamma-ray radiations. For example, the high-energy EM radiations may have photons of energy greater than about 1 keV. The high-energy EM radiations may be hard X-ray radiations having photons of energy greater than about 10 keV. For example, the EM source 210 may include an X-ray source for providing X-rays having an energy in the region of about 20 keV to about 200 keV. An X-ray source of higher energy, for instance between about 500 keV to about 1 MeV could be used for heavy duty applications such as cargo screening. The EM source 210 may be a polychromatic source or a monochromatic source of EM radiation.

The mask 220 may be formed by a solid body made of a radiopaque material provided with a shaped slit. Example of radiopaque materials that can block X-rays include tungsten or alloys made of steel and lead or from combinations of these materials. The mask 220 may be provided with an annular-shaped slit for forming a primary beam 230 having a conical shell profile and referred to as conical shell beam. Alternatively the mask 220 may be designed to form a primary beam having other hollow beam shapes.

The primary beam modulator 240 is provided on the propagation axis 205 at a distance L from the mask 220. The space provided between the mask 220 and the modulator 240 forms an inspection volume. The distance L may be adjusted to receive samples of different sizes within the inspection volume. In this example, the beam modulator 240 is a flat piece of material provided with a central aperture. The beam modulator 240 may be made of a crystalline material to diffract the primary beam 230, or of an amorphous material to scatter the primary beam 230. For instance, the beam modulator 240 may be formed of a plate made of one or more metallic compounds or alloys. The beam modulator 240 may also be a plate made of a non-metallic material such as carbon fibre. The material(s) that form the modulator 240 can be chosen to generate a specific scattering pattern. For instance, the modulator 240 may have atomic spatial regularity that persists for 10's or 100's of microns (long range order) and be designed to diffract specific energies from the primary beam to facilitate a measurement of attenuation at those energies. For example, modulator materials that have predominately small d-spacings will preferentially scatter higher energies from the primary beam, facilitating measurements of attenuation at higher energies. For example, Bragg maxima occur corresponding to d-spacings no greater than 0.203 nm, 0.208 nm and 0.21 nm for nickel, copper and magnesium oxide respectively. Conversely modulator materials that produce Bragg maxima corresponding to larger d-spacings will preferentially scatter lower energies from the primary beam, facilitating measurements of attenuation at lower energies. For example, principal Bragg maxima occur corresponding to d-spacings no less than 0.759 nm, 1.385 nm and 2.174 nm for ammonium iron sulphate, dl-leucine and dioctyl sodium sulfosuccinate docusate sodium respectively. Modulator materials with high crystallographic symmetry (e.g. metals, sodium chloride, potassium chloride etc) will diffract at limited numbers of discrete energies thus facilitating measurements of primary beam attenuation at those discrete energies. Modulators with low crystallographic symmetry or modulators formed from amorphous materials will scatter the primary beam more uniformly (e.g. sodium lead phosphate, chlordiazepoxide, silica). The beam modulator 240 is positioned to form a plane normal to the propagation axis 205 of the primary beam 230. The conical shell beam 230 is a hollow beam that forms a continuous two-dimensional profile of incident radiation 231 on the plane of the beam modulator 240.

When the beam modulator 240 is provided by a flat member, the beam modulator operates in a transmission mode. However the beam modulator may be shaped to operate in a reflection mode. In this scenario the beam modulator may have a tubular shape aligned such that when the primary beam hits the inside of the tube, the modulator reflects the scatter/diffracted photons down the collimator.

The collimator 250, also referred to as grid structure, is provided on the propagation axis 205 between the primary beam modulator 240 and the energy resolving detector 260. The collimator 250 may be positioned such that the input surface of the collimator is substantially normal to the propagation axis 205. The detector 260 is positioned such that its detection surface is substantially parallel to the output surface of the collimator 250. The collimator 250 is used to constrain the incidence of electromagnetic radiation onto the detector 260, which only collects data arising from a particular angle of scatter or diffraction. The collimator 250 is elongated and includes a plurality of channels extending between its input and its output. In the example of FIG. 2, the channels have a hexagonal cross section, however it will be appreciated that different channel shapes may be used allowing the channels to be arranged in a tessellated fashion. The walls forming the channels may be formed from suitable material to block or substantially attenuate X-ray radiation, such as tungsten or lead antimony alloy.

The energy resolving detector 260 may be spatially resolving, such as a pixelated energy resolving X-ray detector. The energy resolving detector 260 can be coupled to a data analyser to store and analyse the collected data. The data analyser may include a storage medium and a processor configured to execute instructions for carrying out processing of the data. The instructions may be downloaded or installed from a computer-readable medium which is provided for implementing data analysis according to the disclosure. For example, the processor may be configured to execute an algorithm to calculate a parameter of the sample which may be used to identify the sample. For instance, the parameter may be a lattice spacing (d-spacing) of the sample. Sample identification may then be communicated to a user by a suitable display or other type of indicia such as an audible or visible alarm signal. The processor may be provided in a remote server in communication with the detector. An image of an object under inspection can also be generated, hence allowing to locate the sample of interest. For instance, the diffracted X-ray flux can be used to generate an image.

In operation, the primary beam 230 produces a circular footprint 231 on the plane of the modulator 240. The primary beam 230 interacts with the modulator 240 at multiple scattering points along the circular footprint 231. The scattered rays 270 passing through the channels of the collimator 250 are detected by the energy resolving detector 260. When a sample is placed within the inspection volume, the detector 260 measures the energy of the photons scattered by the sample at known angles of scatter.

Depending on the nature of the beam modulator 240, the EM radiation may be a diffracted beam at the diffraction angle two-theta (2θ). The two-theta angle is the angle between an incident X-ray beam and the diffracted X-ray. The two-theta angle at which scattered photons are collected by each collimator channel is determined by the angle subtended by the longitudinal axis of the collimator channel and the primary beam 230. The collimator 250 collects scattered flux propagating normal to the detection surface and therefore the opening angle of the primary beam determines the two-theta angle in this case.

The conical shell beam 230 is formed of a plurality of rays of electromagnetic radiation, also referred to as primary rays. The primary rays intersect the primary beam modulator 240. The primary beam modulator scatters a proportion of the primary rays through the channels of the collimator 250 and are detected by the energy resolved detector 260. When a sample intersects the conical shell beam 230, the primary rays passing through the sample are attenuated. These attenuated primary rays intersect the primary beam modulator. The primary beam modulator scatters a proportion of the attenuated primary rays through the channels of the collimator 250 and are detected by the energy resolved detector 260. The energy resolved detector 260 is pixelated and so the location of the attenuated signals may be correlated with the diffracted signals from a sample. The system 200 can be used to perform measurements of X-ray attenuation at multiple energies and is therefore similar to dual-energy absorptiometry.

Figure 2B:
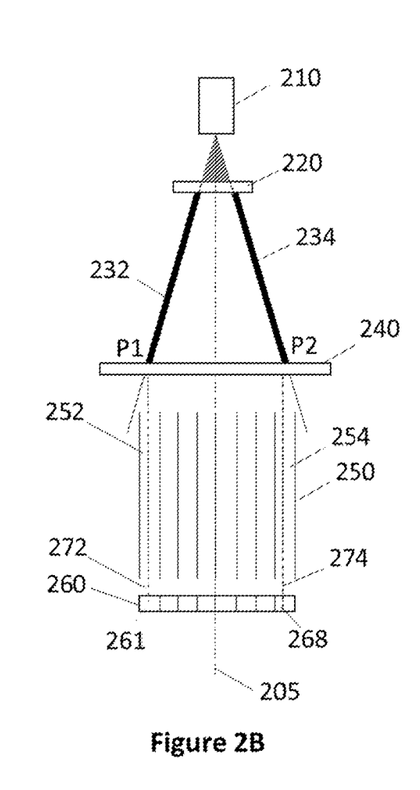
FIG. 2B is a sectional view of the X-ray apparatus of FIG. 2A without sample.

FIG. 2B shows a cross section of the system 200 of FIG. 2A along a line A-A'. The conical shell beam 230 interacts with the modulator 240 at multiple scattering points. For instance, the primary ray 232 interacts with the modulator 240 at point P1 to produce a scattered ray 272. Similarly, the primary ray 234 interacts with the modulator 240 at point P2 to produce a scattered ray 274. The scattered rays 272 and 274 travel through the channels 252 and 254 of the collimator and reach the energy detector a sampling region or pixel 261 and 268, respectively. The scattered rays 272, 274 arising from P1, P2 can reach the detector 260, while other beams scattered with different angles are prevented from reaching the detector.

Figure 2C:
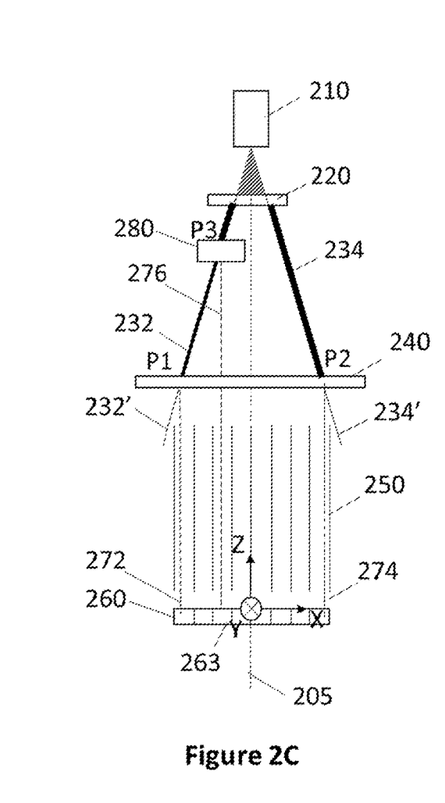
FIG. 2C is a sectional view of the X-ray apparatus of FIG. 2A with sample.

FIG. 2C illustrates a cross section of the system 200 of FIG. 2A along a line A-A', when a diffracting sample 280 is provided within the inspection volume. The sample 280 intersects the primary beam 230 at point P3. This produces a ray 276 of diffracted photons at a fixed diffraction angle. The ray 276 passes through the collimator 250 and is collected by the pixel 263 of the energy-resolving detector 260. It will be appreciated that the system could also work with an amorphous sample producing a scattered ray at a fixed scattered angle.

The spatial distribution of the incident photons on the detector 260 provides the location of the diffracting sample 280. Stated another way, the three dimensional coordinates (x,y,z) of the sample 280 can be retrieved based on the location of the pixels measuring the signal. For instance the three dimensional coordinates may be defined with respect to an origin provided at the centre of the surface of the detector 260 as shown in FIG. 2C. The nature of the diffracting sample can be retrieved by calculating the d-spacing of the sample from the energy of the photons.

The angular/energy distribution of the scattered intensity is unique to each different crystal structure and thus can be used to identify a material and determine characteristics such as lattice dimensions, crystallite size and percentage crystallinity. The relationship between the lattice spacing (d), and the angle (θ) subtended by the diffracted or scattered radiation from a plane of atoms inside a crystal is provided by the Bragg condition: $n\lambda = 2d \sin \theta$, in which $\lambda$ is the wavelength of the incoming radiation and (n) is an integer. The angle subtended by the diffracted or scattered radiation and the interrogating or primary radiation is 2θ (two theta).

When the primary beam 230 intersects the modulator 240 at a known angle of incidence, the diffracted/scattered rays 272 and 274 travel unimpeded through the collimator 250 onto the energy-resolving detector 260 producing a characteristic energy spectrum. The primary beam may become attenuated as it passes through a sample. This attenuation alters the number (i.e. intensity) and distribution of diffracted/scattered rays from the primary beam modulator that are incident on the energy-resolving detector 260.

The number and energy distribution of photons removed from the primary beam (i.e that are attenuated) is a direct result of the sample materials that are intersected. The differences in the spectrum may be viewed spatially as an xy image of the samples, whereby the contrast mechanism may be for instance the total scattering from the primary beam modulator. Spatial images may also be produced by collating the photons in different energy bands. The contrast in this type of image is directly comparable to how the contrast is produced in a pre-screening module.

The location P1 where the primary beam 230 intersects the modulator 240 is encoded on the pixelated detector 260. The energy spectrum derived from the diffracted/scattered ray 272 is produced by the transmitted ray 232', and therefore the primary ray 232 incident on the sample 280. Contrast in the diffracted/scattered ray 272 is the result of attenuation of the primary ray 232. The path of the primary ray is known and therefore the attenuation can be attributed to sample materials on the same path. Contrast attributed to the sample 280 can be correlated with contrast generated by the initial screening module.

The lensing effect provided by the modulator 240 permits to retrieve indirectly the direction of travel of the primary ray 232 passing through the sample 280. This is achieved using a relatively small energy-resolving detector, compared to the size of the detector that would be required to detect the primary beam without the provision of the modulator 240. The same detector is used to retrieve both energy spectra arising from the sample, and energy spectra arising from the modulator. As a result, a compact system can be implemented.

Figure 3:
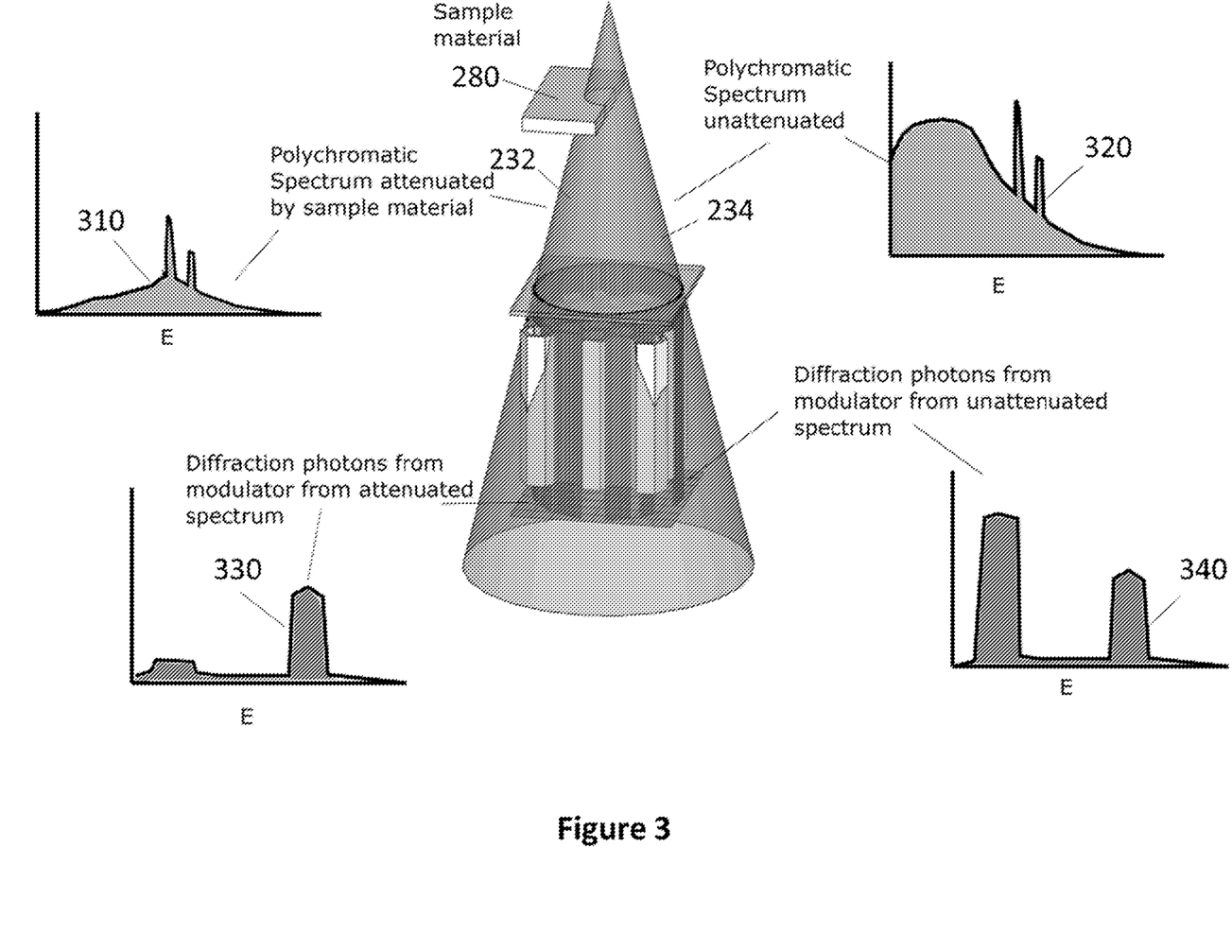
FIG. 3 is a diagram showing four energy spectra obtained by the X-ray apparatus of FIG. 2.

FIG. 3 illustrates various energy spectra 310, 320, 330 and 340. The energy spectrum 310 illustrates the spectrum of an X-ray beam portion 232 attenuated by the sample 280. The energy spectrum 320 illustrates the spectrum of an unattenuated X-ray beam portion 234. The energy spectrum 330 illustrates the spectrum of scattered/diffracted photons arising from the interaction between the attenuated X-ray beam portion 232 and the modulator 240. The energy spectrum 340 illustrates the spectrum of diffracted photons arising from the interaction between the unattenuated X-ray beam 234 and the modulator 240.

Figure 4:
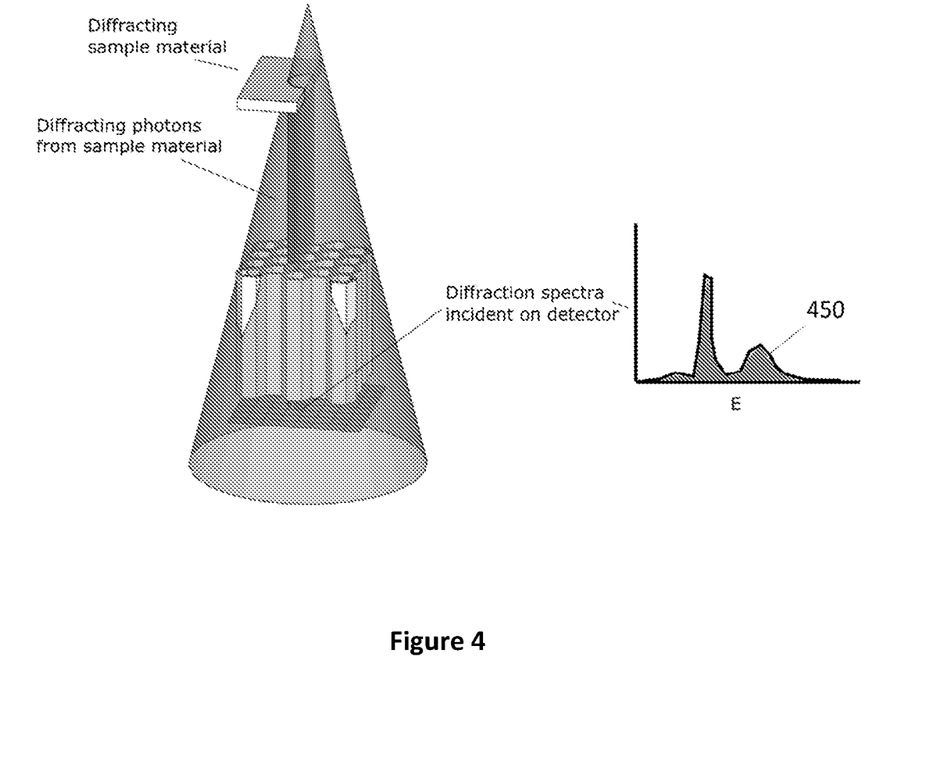
FIG. 4 is an energy spectrum of photons diffracted by a sample using the apparatus of FIG. 2.

FIG. 4 illustrates an energy spectrum 450 of diffracted photons arising from the interaction between the unattenuated X-ray beam portion 232 and the sample 280.

Figure 5:
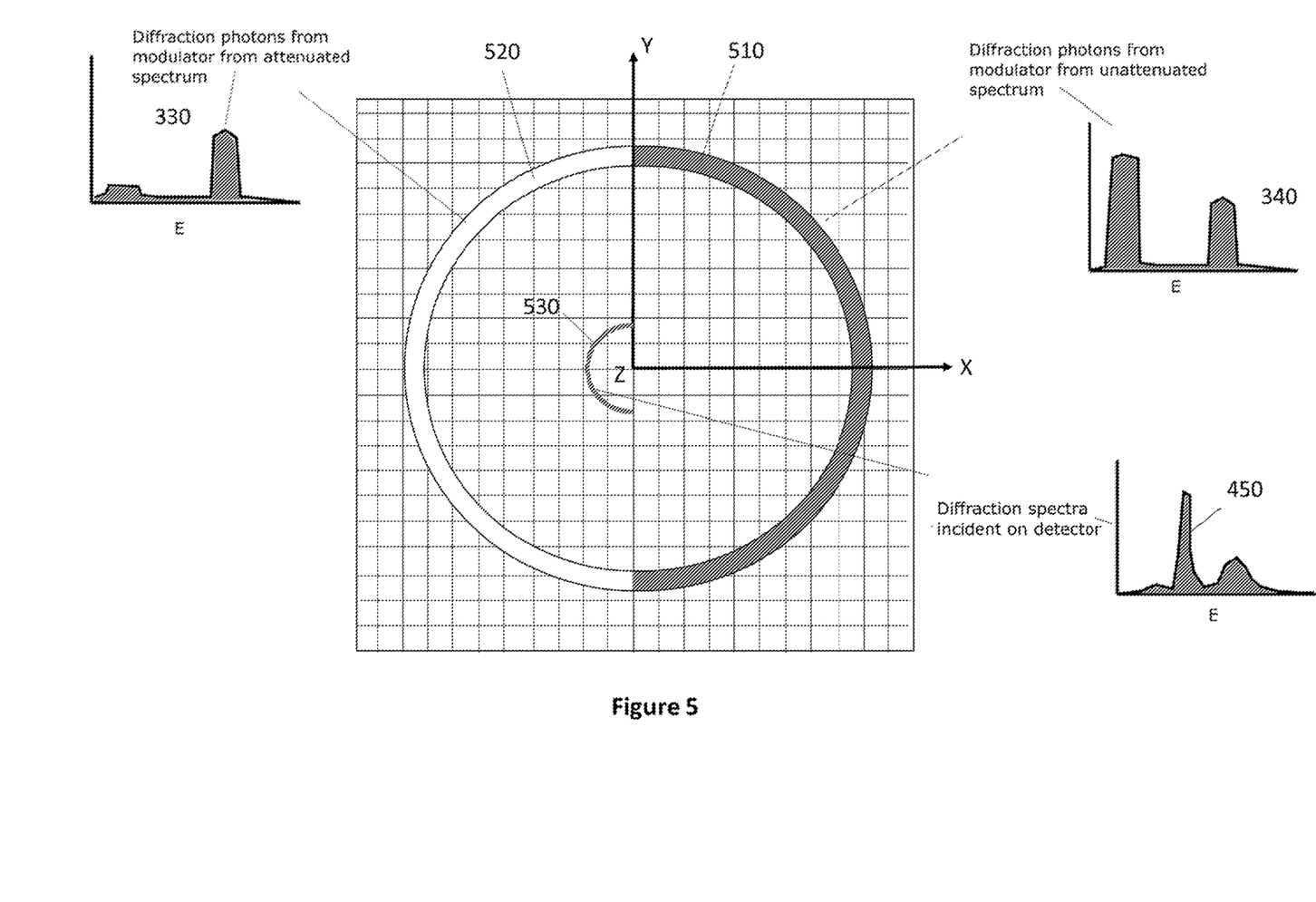
FIG. 5 is a top view of an energy-resolving detector as used in the apparatus of FIG. 2.

FIG. 5 shows a top view of the energy-resolving detector 260. Four separate regions of illuminations are schematically represented. The semi-circular region 510 corresponds to the diffracted photons from the modulator 240 arising from the unattenuated beam 234 (FIG. 3). The semi-circular region 520 corresponds to the diffracted photons from the modulator 240 arising from the attenuated beam 232 (FIG. 3). The semi-circular region 530 corresponds to the diffracted photons from the sample 280 (FIG. 4).

Each pixel of the energy-resolving detector 260 can be used to produce a corresponding energy spectrum. The pixels of the circular region 510 may be used to calculate the average spectrum 340. The pixels of the circular region 520 may be used to calculate the average spectrum 330. Similarly the pixels of the circular region 530 may be used to calculate the average spectrum 450. The data collected during the scanning process may also be used to obtain a 2D image of the sample. A contrast image of the sample can be obtained using the energy spectra from the region 510 and the region 520. For instance each energy spectrum derived from region 510 may be integrated to obtain a characteristic unattenuated value. Similarly each energy spectrum derived from region 520 may be integrated to obtain a characteristic attenuated value. Then a ratio of the attenuated and unattenuated characteristic values for each pixel may be used to obtain the contrast image. Spatial images may also be produced by collating the photons in different energy bands. An image of the sample may also be derived from the energy spectra associated with the pixels of region 530.

The differences in energy spectrum produces contrast due to the attenuating properties of the sample materials. This contrast is characteristic of the effective atomic number Zeff of the sample and its electron density.

Figure 6A:
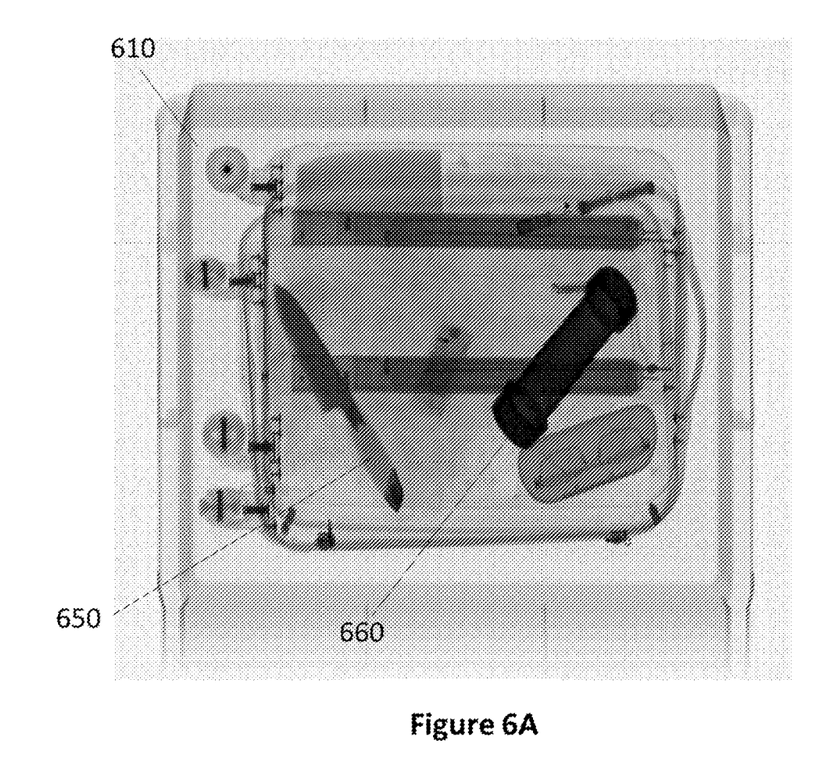
FIG. 6A is an absorption X-ray image of a suitcase.

FIG. 6A illustrates an absorption X-ray image 610 of a suitcase obtained by an initial screening module, for instance the first module 110 of FIG. 1.

Figure 6B:
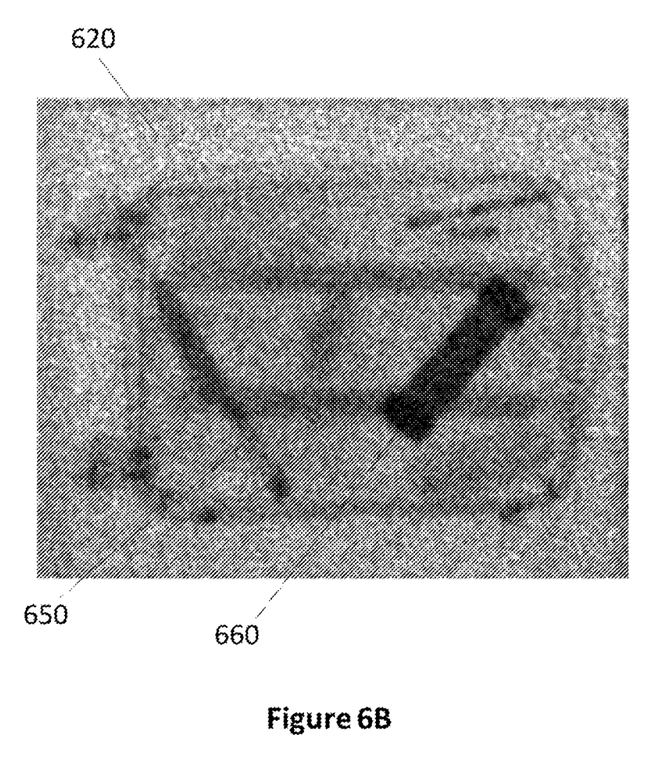
FIG. 6B is a contrast image of the suitcase of FIG. 6A.

FIG. 6B illustrates a contrast image 620 of the same suitcase obtained using the secondary module of the disclosure. By comparing the features of image 610 and 620, the location of an item of interest can be checked. For instance it can be verified that the location of the knife 650 and the suspected illegal item 660 within the suitcase are the same in FIGS. 610 and 620. Based on the proposed approach, a location of an item of interest can be confirmed or validated prior to sampling, hence improving the reliability of the system. In addition an automatic image registration function may be implemented between the initial screening module and the secondary screening module.

Figure 7A:
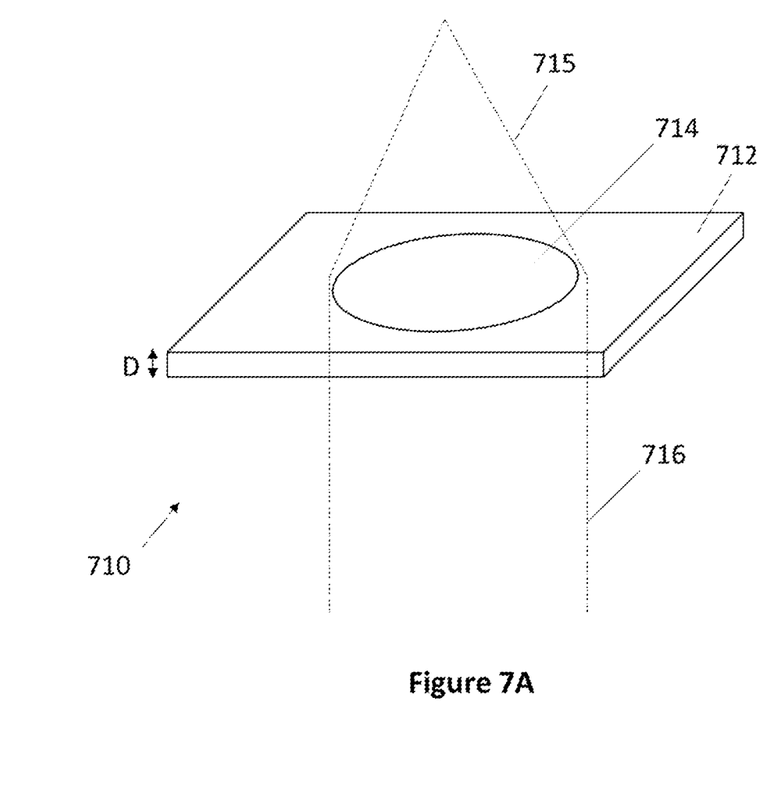
FIG. 7A is a profile view of a transmission beam modulator.

FIG. 7A illustrates a transmission beam modulator 710. The beam modulator 710 is made of a substantially flat body 712 of thickness D and forming an aperture 714. In the present example the body has a flat square shape provided with a central aperture. The aperture 714 may have a shape that matches the shape of the primary beam. In the above example the primary beam has a conical shell profile and the aperture 714 has a circular shape. The size of the aperture 714 may be large enough to allow a scattered beam arising from the sample to pass through it. The thickness D of the body 712 may vary depending on the chosen material making the beam modulator 710 and the specific application. The modulator 710 is used in a transmission mode such that when a primary ray 715 intersects the body 714, a transmitted diffracted (or scattered) ray 716 is produced.

Figure 7B:
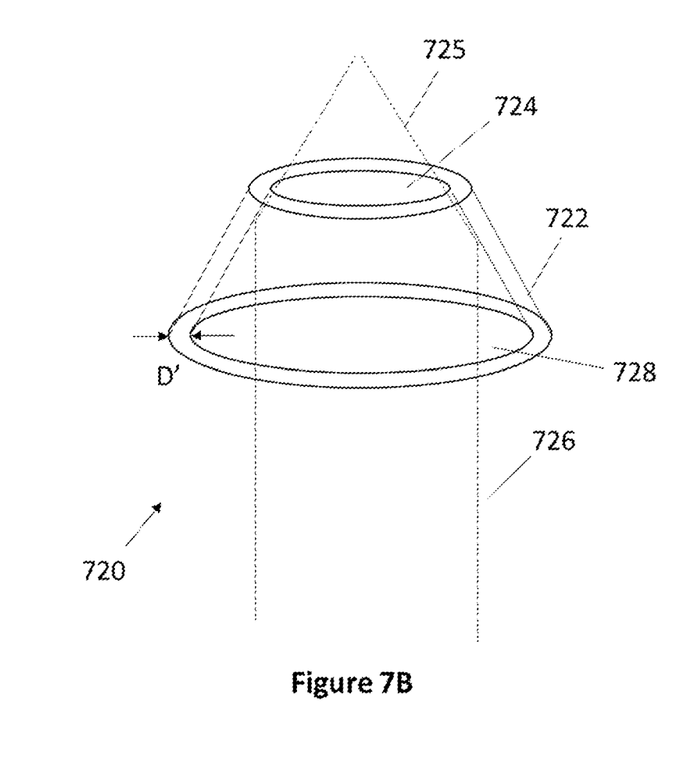
FIG. 7B is a profile view of a reflection beam modulator.

FIG. 7B illustrates a reflection beam modulator 720 having a truncated cone shape. The beam modulator 720 is made of a tubular body 722 having a tapered wall of thickness D' extending between a first end and a second end such that an aperture 724 at the first end is smaller than a bottom aperture 728 at the second end. The shape of the tubular body 722 may be chosen to match the profile of the primary beam. For instance a tubular body may be a tapered tubular beam having a plurality of tapered walls such as a truncated pyramid. The thickness D' of the body 722 may vary depending on the chosen material making the beam modulator 720 and the specific application. The modulator 720 is used in a reflexion mode such that when a primary ray 725 intersects the inner surface of the tapered wall, a reflected diffracted (or scattered) ray 726 is produced.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A sample inspection system comprising
a beam former adapted to receive an electromagnetic radiation from a source of ionizing radiation to generate a primary beam, the primary beam being a beam of at least one of X-ray radiation and gamma-ray radiation;
a beam modulator distal from the beam former to define an inspection volume for receiving a sample on a path of the primary beam; wherein the beam modulator comprises a body forming an aperture;
an energy resolving detector and
a collimator arranged between the beam modulator and the energy resolving detector, the collimator comprising a plurality of channels, each channel being adapted to receive diffracted or scattered radiation;
wherein upon incidence of the primary beam the beam modulator, the beam modulator provides a reference beam of diffracted or scattered radiation, the energy resolving detector being arranged to detect the reference beam and radiation scattered or diffracted by the sample.

2. The sample inspection system as claimed in claim 1, wherein the energy resolving detector is spatially resolved to provide energy spectra corresponding to different locations of the energy resolving detector.

3. The sample inspection system as claimed in claim 1 comprising a processor coupled to the energy resolving detector.

4. The sample inspection system as claimed in claim 3, wherein the processor is configured to compare energy spectra derived from an attenuated primary beam with energy spectra derived from an unattenuated beam to generate a contrast image of the sample.

5. The sample inspection system as claimed in claim 4, wherein the contrast image is generated by comparing one or more predefined of both energy bands of the energy spectra derived from the attenuated primary beam and the unattenuated beam.

6. The sample inspection system as claimed in claim 4, wherein the processor is configured to calculate at least one of an effective atomic number and an electron density of the sample based on the comparison.

7. The sample inspection system as claimed in claim 4, wherein the processor is adapted to compare the contrast image with another image to confirm a location of the sample.

8. The sample inspection system as claimed in claim 3, wherein the processor is configured to calculate a parameter of the sample based on detected diffracted radiation from the sample; wherein the parameter comprises a lattice spacing of the sample.

9. The sample inspection system as claimed in claim 1, wherein the body of the beam modulator is flat.

10. The sample inspection system as claimed in claim 1, wherein the beam modulator comprises a tapered tubular body.

11. The sample inspection system as claimed in claim 1, wherein the beam modulator is made at least in part of a crystalline material.

12. The sample inspection system as claimed in claim 11, wherein the crystalline material has a lattice d-spacing less than about 2.5 angstroms or wherein the crystalline material has a lattice d-spacing greater than about 7 angstroms.

13. The sample inspection system as claimed in claim 1, wherein the beam modulator made at least in part of an amorphous material.

14. The sample inspection system as claimed in claim 1, wherein the primary beam is a conical shell beam of electromagnetic radiation.

15. The sample inspection system as claimed in claim 1, wherein the primary beam has a characteristic propagation axis associated with it, and wherein the collimator is provided along the characteristic propagation axis of the primary beam.

16. The sample inspection system as claimed in claim 1, comprising a source of electromagnetic radiation wherein the source of electromagnetic radiation comprises the source of ionizing radiation.

17. The sample inspection system as claimed in claim 16, wherein the source of electromagnetic radiation is a polychromatic source.

18. The sample inspection system as claimed in claim 16, wherein the source of electromagnetic radiation, the beam former, the beam modulator, the collimator and the energy resolving detector form a detection apparatus, the inspection system comprising a mechanical apparatus for moving the detection apparatus to a specific position to inspect the sample, and a controller for controlling the mechanical apparatus.

19. The sample inspection system as claimed in claim 18, wherein the controller is adapted to receive coordinates of a sample of interest.

20. A method for inspecting a sample, the method comprising
   providing a beam former adapted to receive an electromagnetic radiation from a source of ionizing radiation,
   generating with the beam former a primary beam, the primary beam being a beam of at least one of X-ray radiation and gamma-ray radiation;
   providing a beam modulator distal from the beam former to define an inspection volume; wherein the beam modulator comprises a body forming an aperture;
   providing an energy resolving detector and a collimator arranged between the beam modulator and the energy resolving detector, the collimator comprising a plurality of channels, each channel being adapted to receive diffracted or scattered radiation;
   illuminating the beam modulator with the primary beam to generate a reference beam of diffracted or scattered radiation,
   providing a sample within the inspection volume on a path of the primary beam; and
   detecting, using the energy resolving detector, the reference beam and radiation scattered or diffracted by the sample.

21. The method as claimed in claim 20, comprising
   providing the sample within the inspection volume such that a portion of the primary beam transmitted through the sample is attenuated, while the remaining part of the primary beam remains unattenuated, and
   comparing energy spectra derived from the attenuated primary beam with energy spectra derived from the unattenuated beam to generate a contrast image of the sample.

* * * * *